United States Patent
Lin

(10) Patent No.: US 11,347,592 B2
(45) Date of Patent: *May 31, 2022

(54) METHOD AND COMPUTER PROGRAM PRODUCT AND APPARATUS FOR HANDLING SUDDEN POWER OFF RECOVERY

(71) Applicant: Silicon Motion, Inc., Zhubei (TW)

(72) Inventor: Wen-Sheng Lin, Kaohsiung (TW)

(73) Assignee: SILICON MOTION, INC., Zhubei (TW)

( * ) Notice: Subject to any disclaimer, the term of this patent is extended or adjusted under 35 U.S.C. 154(b) by 365 days.

This patent is subject to a terminal disclaimer.

(21) Appl. No.: 16/662,874

(22) Filed: Oct. 24, 2019

(65) Prior Publication Data
US 2021/0026738 A1 Jan. 28, 2021

(30) Foreign Application Priority Data
Jul. 23, 2019 (CN) .......................... 201910666078.X

(51) Int. Cl.
*G06F 11/14* (2006.01)
*G06F 11/10* (2006.01)
(Continued)

(52) U.S. Cl.
CPC .......... *G06F 11/1441* (2013.01); *G06F 3/064* (2013.01); *G06F 3/0619* (2013.01);
(Continued)

(58) Field of Classification Search
CPC .... G06F 11/1441; G06F 3/0619; G06F 3/064; G06F 11/1044; G06F 11/1451;
(Continued)

(56) References Cited

U.S. PATENT DOCUMENTS 9,164,887 B2 10/2015 Chiueh et al.
10,871,924 B1 * 12/2020 Lin ........................ G06F 3/0619
(Continued)

FOREIGN PATENT DOCUMENTS

CN 100377119 C 3/2008
CN 102073600 A 5/2011
(Continued)

OTHER PUBLICATIONS

English translation of the Taiwanese Search Report dated May 18, 2028 for Application No. 108125911.
(Continued)

*Primary Examiner* — Yair Leibovich
(74) *Attorney, Agent, or Firm* — Birch, Stewart, Kolasch & Birch, LLP

(57) ABSTRACT

The invention introduces a non-transitory computer program product for handling a sudden power off recovery (SPOR) to include program code to: drive a flash access interface to read pages of a current block in sequence after a power restart subsequent to a sudden power off (SPO); mark the last correct page of the current block according to page read statuses for the current block; configure n1 pages after the next page of the last correct page of the current block as dummy pages; and drive the flash access interface to store data of the last correct page and its previous n2-1 pages of the current block in empty pages after the last dummy page of the current block, wherein any of n1 and n2 is a positive integer.

20 Claims, 13 Drawing Sheets

(51) Int. Cl.
  *G06F 12/1009* (2016.01)
  *G06F 12/02* (2006.01)
  *G06F 3/06* (2006.01)

(52) U.S. Cl.
  CPC ...... *G06F 11/1044* (2013.01); *G06F 11/1451* (2013.01); *G06F 12/0246* (2013.01); *G06F 12/1009* (2013.01); *G06F 3/0679* (2013.01)

(58) Field of Classification Search
  CPC ............. G06F 12/0246; G06F 12/1009; G06F 3/0679; G06F 11/1072; G06F 2212/1032; G06F 2212/7204; G06F 2212/7205; G06F 2212/7208; G06F 2212/7201
  USPC .......................................................... 714/6.3
  See application file for complete search history.

(56) References Cited

U.S. PATENT DOCUMENTS

| | | |
|---|---|---|
| 2016/0179625 A1 | 6/2016 | Hong |
| 2016/0268000 A1 | 9/2016 | Thompson et al. |
| 2018/0114570 A1 | 4/2018 | Lin |
| 2018/0165191 A1 | 6/2018 | Lin |
| 2018/0307496 A1 | 10/2018 | Ke |
| 2019/0196743 A1 | 6/2019 | Hsieh |
| 2019/0220392 A1 | 7/2019 | Lin et al. |
| 2020/0211603 A1* | 7/2020 | Luo ..................... G11C 11/4099 |

FOREIGN PATENT DOCUMENTS

| | | |
|---|---|---|
| CN | 102902637 A | 1/2013 |
| CN | 109213772 A | 1/2019 |
| CN | 101763295 A | 6/2020 |
| TW | 201324154 A1 | 6/2013 |
| TW | I606388 B | 11/2017 |
| TW | I621129 B | 4/2018 |
| TW | I628542 B | 7/2018 |
| TW | 201928990 A | 7/2019 |

OTHER PUBLICATIONS

English translation of Taiwanese Search Report for Taiwanese Application 108125982, completed Mar. 31, 2020.

* cited by examiner

METHOD AND COMPUTER PROGRAM PRODUCT AND APPARATUS FOR HANDLING SUDDEN POWER OFF RECOVERY

CROSS-REFERENCE TO RELATED APPLICATIONS

This application claims the benefit of priority to Patent Application No. 201910666078.X, filed in China on Jul. 23, 2019; the entirety of which is incorporated herein by reference for all purposes.

BACKGROUND

The disclosure generally relates to flash memory and, more particularly, to methods and computer program products and apparatuses for handling sudden power off recovery (SPOR).

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

Data programming operations may be interrupted after a sudden power off (SPO) induced by a natural or man-made disaster. Thus, it is desirable to have methods and computer program products and apparatuses for handling SPOR, so as to recover the interrupted data programming operations.

SUMMARY

In an aspect of the invention, a method for handling a sudden power off recovery (SPOR) is performed by a processing unit when loading and executing relevant firmware or software code to include steps: reading pages of a current block in sequence after a power restart subsequent to a sudden power off (SPO); marking the last correct page of the current block according to page read statuses for the current block; configuring n1 pages after the next page of the last correct page of the current block as dummy pages; and storing data of the last correct page and its previous n2-1 pages of the current block in empty pages after the last dummy page of the current block, where any of n1 and n2 is a positive integer. The current block is a multi-level cell (MLC) block or a triple level cell (TLC) block.

In another aspect of the invention, a computer program product for handling a SPOR is introduced to include program code when being loaded and executed by a processing unit to practice the method described above.

In a further aspect of the invention, an apparatus for handling a SPOR is introduced to include a flash access interface and a processing unit. The processing unit is arranged to operably perform operations of the method described above.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

Figure 1:
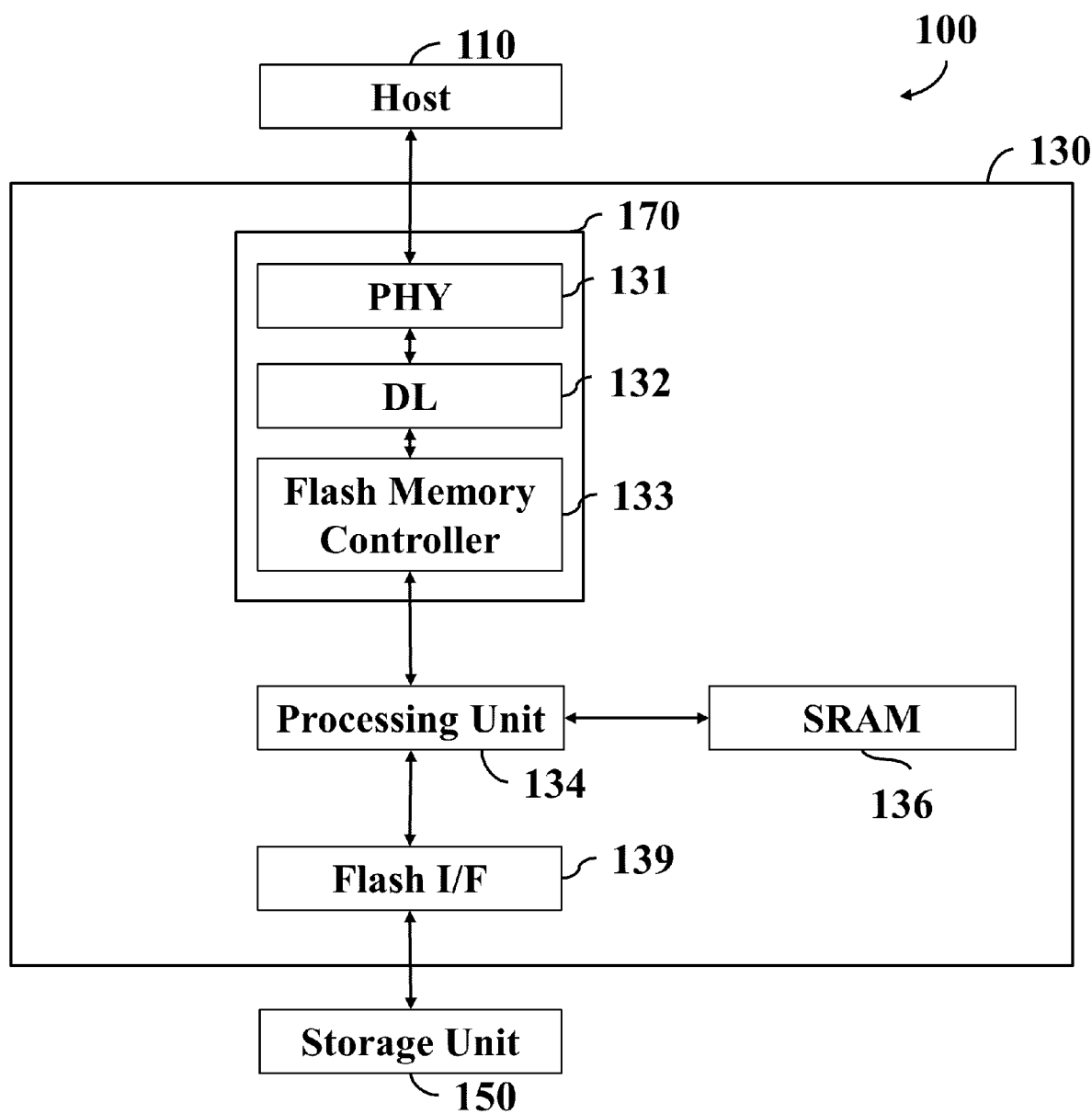
FIG. 1 is the system architecture according to an embodiment of the invention.

Refer to FIG. 1. The system architecture 100 may include a host 110, a device 130 and a storage unit 150. The system architecture may be practiced in a personal computer (PC), a laptop PC, a tablet computer, a mobile phone, a digital camera, a digital recorder, or other electronic consumer products. The device 130 may contain a processing unit 133. The host 110 may communicate with the device 130 through a flash memory protocol, such as Universal Flash Storage (UFS). A flash memory controller 133 is electrically connected (coupled) to the host 110 through a data link (DL) layer 132 and a physical layer (PHY) 131. The flash memory controller 133 may read user data of the storage unit 150 from a data buffer (no shown in FIG. 1) by a direct memory access (DMA) controller (no shown in FIG. 1) and serially clock the user data out to the host 110 through the DL layer 132 and the PHY 131. The flash memory controller 133 may write user data to be programmed into the data buffer by a DMA controller (no shown in FIG. 1). The processing unit 134 may be implemented in numerous ways, such as with general-purpose hardware that is programmed when loading and executing relevant software or firmware instructions to perform the functions recited herein, such as a single-core processor, a multi-core processor with parallel computation capability, a Graphical Processing Unit (GPU), a lightweight general-purpose processor, or others. The flash memory controller 133 may be a UFS controller to communicate with the host 110 through UFS protocol. Although embodiments of the invention describe UFS as an exemplary communications protocol, those artisans may apply the invention to some other communications protocols, such as Universal Serial Bus (USB), Advanced Technology Attachment (ATA), Serial Advanced Technology Attachment (SATA), Peripheral Component Interconnect Express (PCI-E), etc.

The device 130 may further include a flash access interface (I/F) 139 to thereby enable the processing unit 134 to communication with the storage unit 150, specifically, using a Double Data Rate (DDR) protocol, such as Open NAND Flash Interface (ONFI), DDR toggle, or others. The processing unit 134 writes user data into a designated address (a destination address) of the storage unit 150 and reads user data from a designated address (a source address) thereof through the flash access interface 139. The flash access interface 139 may use several electronic signals including a data line, a clock signal line and control signal lines for coordinating command and data transfer between the processing unit 134 and the storage unit 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
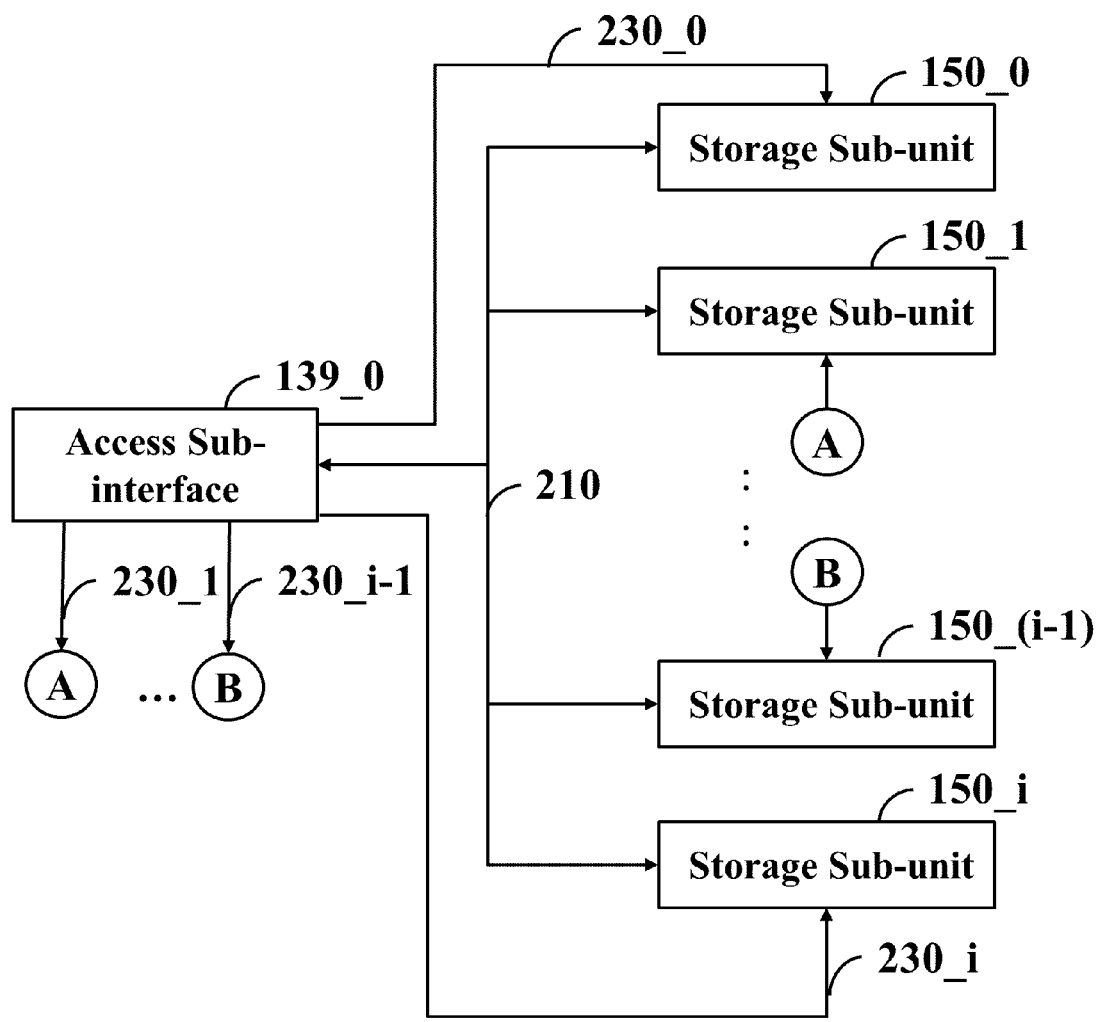
FIG. 2 is a schematic diagram depicting connections between one access sub-interface and multiple storage sub-units according to an embodiment of the invention.

The storage unit 150 may contain multiple storage sub-units and each storage sub-unit may use a respective access sub-interface to communicate with the processing unit 134. One or more storage sub-units may be packaged in a single die. The flash access interface 139 may contain j access sub-interfaces and each access sub-interface may connect to i storage sub-units. Each access sub-interface and the connected storage sub-units behind may be referred to as a I/O channel collectively and each storage sub-unit may be identified by a Logical Unit Number (LUN). That is, i storage sub-units may share the same access sub-interface. For example, assume that the storage device 130 contains 4 I/O channels and each I/O channel connects to 4 storage sub-units: The storage device 130 may access 16 storage sub-units. The processing unit 134 may drive one of the access sub-interfaces to read data from the designated storage sub-unit. Each storage sub-unit has an independent CE control signal. That is, it is required to enable a corresponding CE control signal when attempting to perform data read or programming from or into a designated storage sub-unit via an associated access sub-interface. It is apparent that any number of I/O channels may be provided in the storage device 130, and each I/O channel may include any number of storage sub-units, and the invention should not be limited thereto. Refer to FIG. 2. The processing unit 134, through the access sub-interface 139_0, may use independent CE control signals 230_0 to 230_aAi to select one of the connected storage sub-units 150_0 to 150_i, and then read data from or program data into the designated location of the selected storage sub-unit via the shared data line 210.

Figure 3:
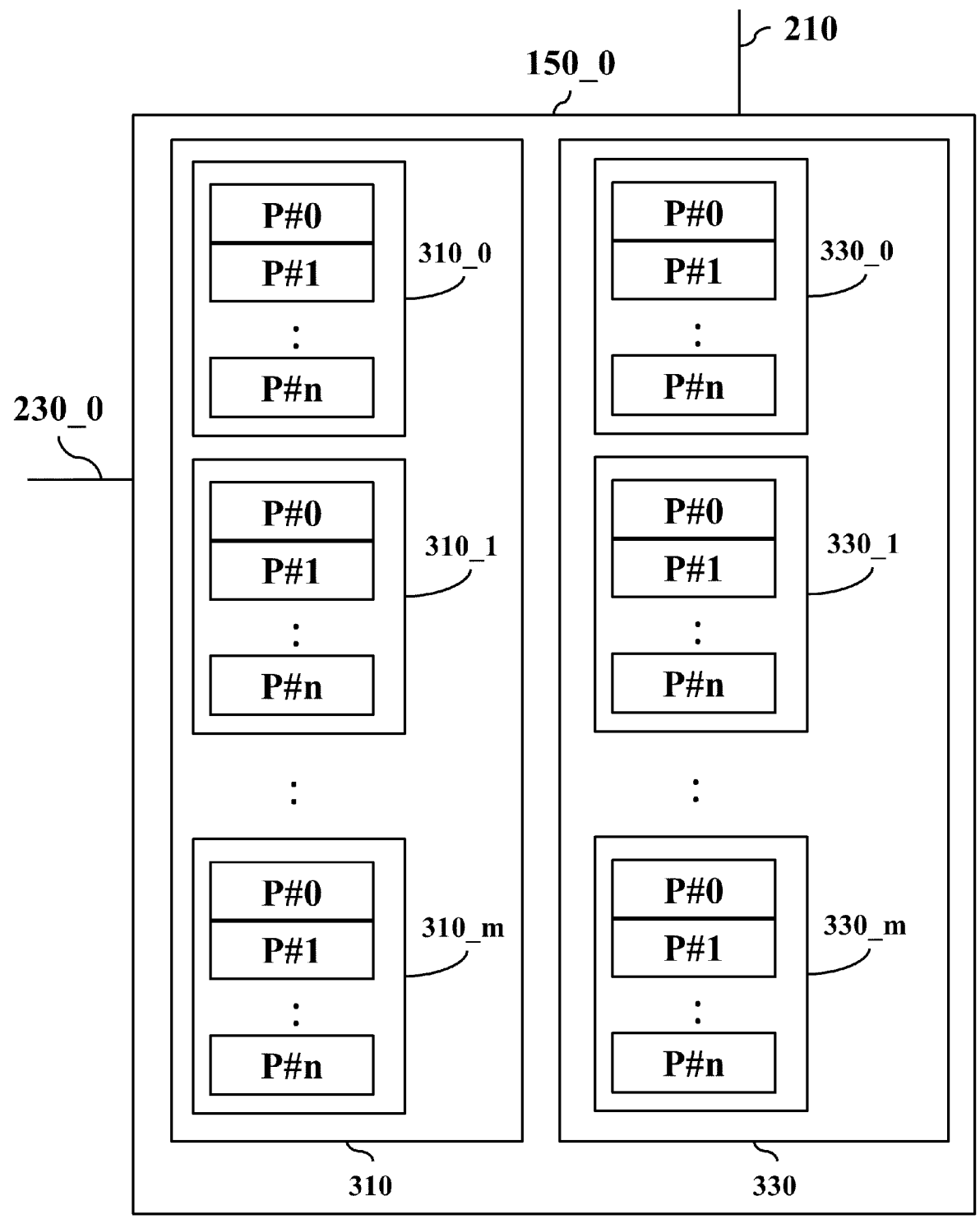
FIG. 3 is the data organization of a storage sub-unit according to an embodiment of the invention.

Each storage sub-unit may include multiple data planes, each data plane may include multiple blocks and each block may include multiple pages. Refer to FIG. 3. Takes the storage sub-unit 150_0 as an example. The storage sub-unit 150_0 includes two data planes 310 and 330. The data plane 310 includes blocks 310_0 to 310_m and the data plane 330 includes blocks 330_0 to 330_m. Each block includes n+1 pages. Each block may be configured as a single-level cell (SLC) block, a multi-level cell (MLC) block or a triple level cell (TLC) block. Each memory cell of the SLC, the MLC and the TLC blocks may store two, four and eight states, respectively. Each word line of the SLC block may store one page of data. Each word line of the MLC block may store two pages of data, including a most significant bit (MSB) page and a least significant bit (LSB) page. Each word line of the TLC block may store three pages of data, including a MSB page, a center significant bit (CSB) page and a LSB page.

Figure 4:
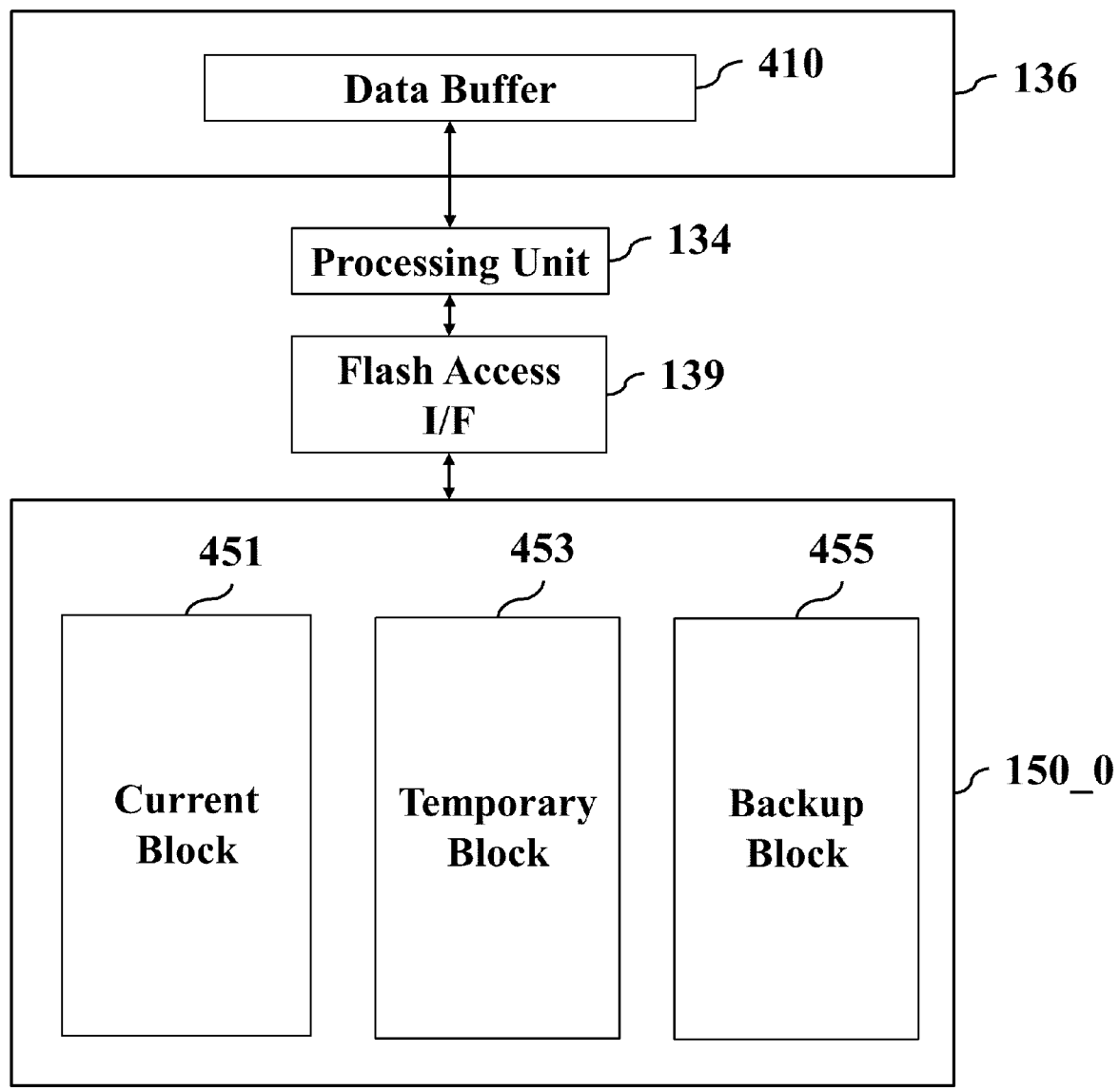
FIG. 4 is a schematic diagram of data block allocations in response to a sudden power off recovery (SPOR) according to an embodiment of the invention.

Refer to FIG. 4. In the direct-write mode, a static random access memory (SRAM) 136 does not allocate cache for buffering a large number of host write commands with data to be programmed, but allocates limited space of a command queue and a data buffer 410 for storing several host write commands with data to be programmed. Different from the cache mode, the processing unit 134 under the direct-write mode completes a host write command after driving the flash access interface 139 to program data into the storage unit 150 according to the host write command. To deal with a variety of host write commands issued by the host 110, the storage sub-unit 150_0 may allocate two blocks: a current block 451; and a temporary block 453. The current block 451 is configured as a MLC or TLC block and the temporary block 453 is configured as a SLC block. Assume that the minimum data unit managed by the host 110 is 4K bytes and a data length of each page (referred to as a page length) of the storage sub-unit 150_0 is 16K bytes: When a host write command instructs the device 130 to write data of one or more page lengths, the processing unit 134 drives the flash access I/F 139 to program the data into one or more empty pages of the current block 451 in the MLC or TLC mode.

When a host write command instructs the device 130 to write data shorter than the page length, the processing unit 134 drives the flash access I/F 139 to program the data into one or more sectors of one empty page of the temporary block 453 in the SLC mode, where each sector stores data of 4K bytes. Once any page of the temporary block 453 is filled with data, the processing unit 134 may drive the flash access I/F 139 to program data of the whole page of the temporary block 453 into an empty page of the current block 451 in the MLC or TLC mode.

Since the current block 451 is an MLC or TLC block (that is, two or three pages of data are stored in the same word line), an occurrence of SPO during a data programming into the current block 451 may additionally damage page data that has been programmed into. For example, refer to FIG. 3. Suppose that the block 310_0 is an MLC block (as the current block), in which the page P#0 is an LSB page of a word line and the page P#3 is a MSB page of the same word line. The pages P#0 and P#3 may be referred to as a page pair. If a SPO happens during a data programming into the page P#3 of the block 310_0, then it probably damages data of the page P#0 that has been programmed into. To prevent the problems as described above, refer to FIG. 4. The storage sub-unit 150_0 further allocate a backup block 455 configured as a SLC block. Before programming data into a MSB page (e.g. the page P#3) of the current block (e.g. the block 310_0), the processing unit 134 drives the flash access I/F 139 to store (or backup) data of a LSB page corresponding to this MSB page of the current block in an empty page of the backup block 455 first, and then, program data into this MSB page of the current block.

Similarly, as to the current block being a TLC block, the processing unit 134 may drive the flash access I/F 139 to store (or backup) data of a CSB page corresponding to this MSB page of the current block in an empty page of the backup block 455 first, and then, program data into this MSB page of the current block. Or, the processing unit 134 may drive the flash access I/F 139 to store (or backup) data of an LSB page corresponding to this CSB page of the current block in an empty page of the backup block 455 first, and then, program data into this CSB page of the current block.

Those artisans may practice any of the current block 451, the temporary block 453 and the backup block 455 in an arbitrary data plane (e.g. the data plane 310 or 330 as shown in FIG. 3).

To shorten the time for handling a SPOR, the processing unit 134 does not spend time as much as possible to reprogram data into the current block 451, instead, reconstructs the current block 451 by obtaining corresponding data from the temporary block 453 and/or the backup block 455. Embodiments of the invention describe ways of storing protection information in spare space of each page of the current block 451, the temporary block 453 and the backup block 455, which can be used in a possible SPOR. To maintain the order of storing page data of the current block 451, the temporary block 453 and the backup block 455 in time, spare space of each page of the current block 451 may record address information pointing to the first empty page of the temporary block 453 (for example, storing the block number of the temporary block 453 and the page number of the first empty page thereof) at the time that the page data of the current block 451 was programmed, and spare space of each page of the temporary block 453 may record address information pointing to the first empty page of the current block 451 (for example, storing the block number of current block 451 and the page number of the first empty page thereof) at the time that the page data of the temporary block 453 was programmed. Also, since data of the CSB page or the LSB page (referred to as a source page) of the current block 451 may be backed up in one page (referred to as a backup page) of the backup block 455, therefore, spare space of one or more pages of the backup block 455 may record address information pointing to the first empty page of the current block 451 (for example, storing the block number of the current block 451 and the page number of the first empty page thereof), as well as address information pointing to the first empty page of the temporary block 453 (for example, storing the block number of the current block 453 and the page number of the first empty page thereof) at the time that the page data of the backup block 455 was programmed.

Figure 5:
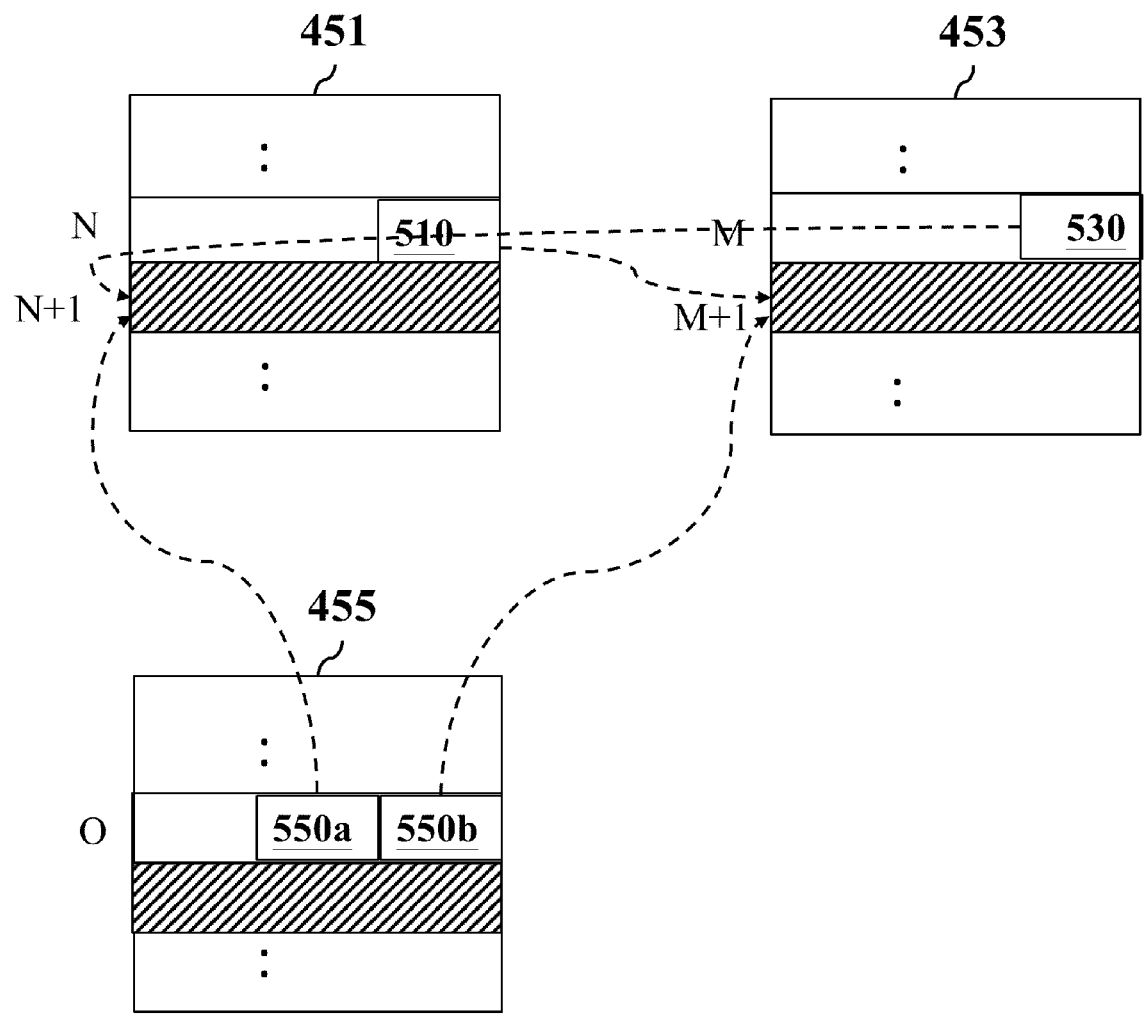
FIGS. 5 and 6 are schematic diagrams showing protection information stored in a current block, a temporary block and a backup block according to an embodiment of the invention.

In some embodiments, spare space of each page of the current block 451, the temporary block 453 and the backup block 455 has capacity for storing address information pointing to two or more pages. Refer to FIG. 5 showing several use cases. Data of the N-th page of the current block 451 is backed up in the O-th page of the backup block 455. The blocks in slashes as shown in FIG. 5 represent empty pages. Spare space 510 of the N-th page of the current block 451 may store address information pointing to the (M+1)-th page of the temporary block 453. Spare space 530 of the M-th page of the temporary block 453 may store address information pointing to the (N+1)-th page of the current block 451. Spare space 550a of the O-th page of the backup block 455 may store address information pointing to the (N+1)-th page of the current block 451 and spare space 550b of the O-th page of the backup block 455 may store address information pointing to the (M+1)-th page of the temporary block 453.

Figure 6:
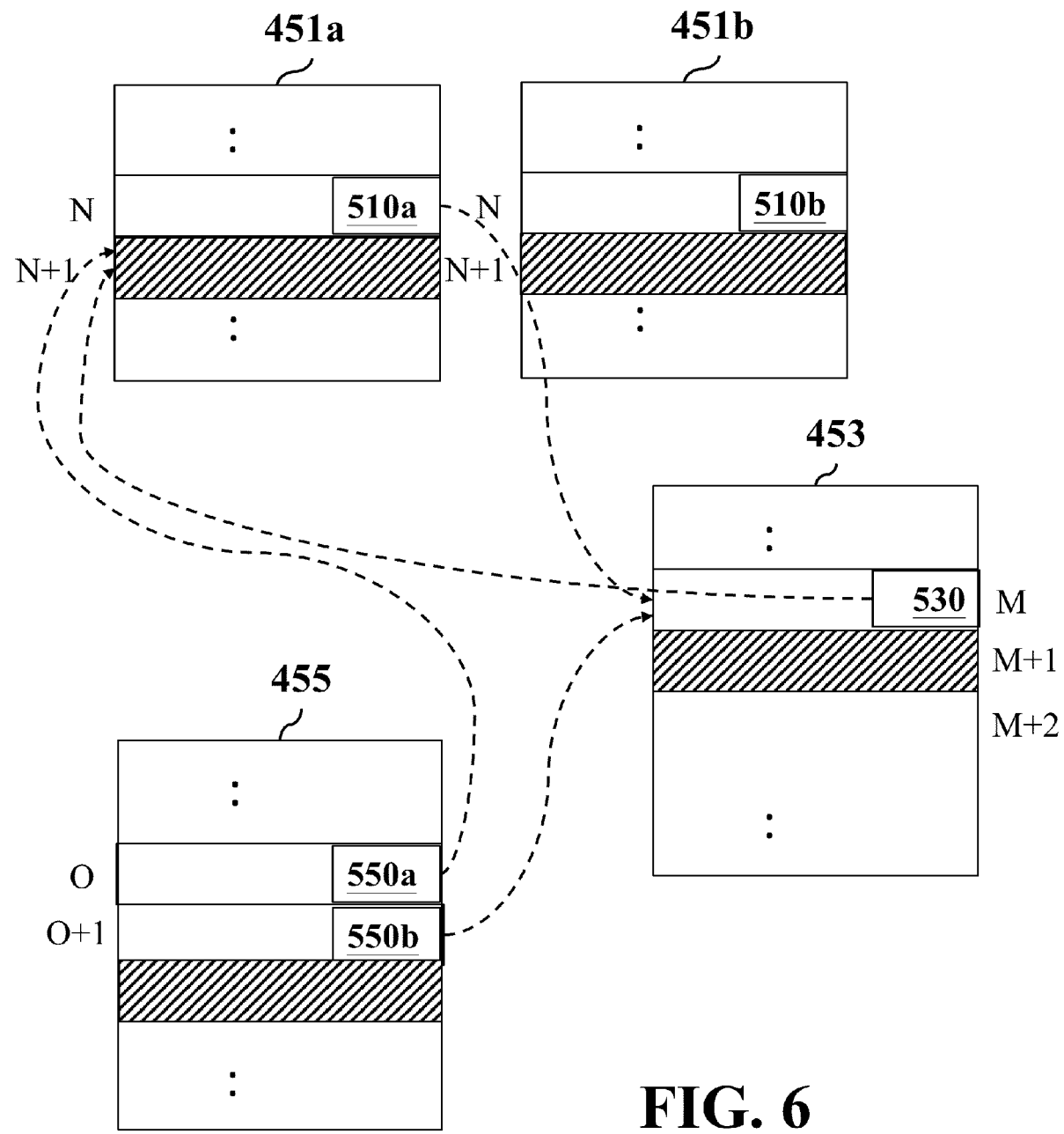

In alternative embodiments, spare space of each page of the current block 451, the temporary block 453 and the backup block 455 has limited capacity for storing address information pointing to only one page. To completely record required protection information in spare space of the backup block 455 as described above, the processing unit 134 programs data into empty pages of the current blocks of the data plane 310 and the data plane 330 alternately and treats the two pages of the data plane 310 and the data plane 330 as a page group. For example, refer to FIG. 3. Assume that the block 310_1 is the current block of the data plane 310 and the block 330_1 is the current block of the data plane 330: The processing unit 134 may program data into the page P#0 of the current block 310_1, the page P#0 of the current block 330_1, the page P#1 of the current block 310_1 and the page P#1 of the current block 330_1 in sequence, where the pages P#0 of the current blocks 310_1 and 330_1 form a page group and the pages P#1 of the current blocks 310_1 and 330_1 form another page group. Refer to FIG. 6 showing several use cases. The current block 451a is allocated on the data plane 310 and the current block 451b is allocated on the data plane 330. Data of the N-th page of the current block 451a is backed up in the O-th page of the backup block 455 and data of the N-th page of the current block 451b is backed up in the (O+1)-th page of the backup block 455. The blocks in slashes as shown in FIG. 6 represent empty pages. Spare space 510a of the N-th page of the current block 451a may store address information pointing to the M-th page of the temporary block 453 and spare space 510b of the N-th page of the current block 451b may store nothing. Spare space 530 of the M-th page of the temporary block 453 may store address information pointing to the (N+1)-th page of the current block 451. Spare space 550a of the O-th page of the backup block 455 may store address information pointing to the (N+1)-th page of the current block 451a and spare space 550b of the (O+1)-th page of the current block 455 may store address information pointing to the M-th page of the temporary block 453.

Figure 7:
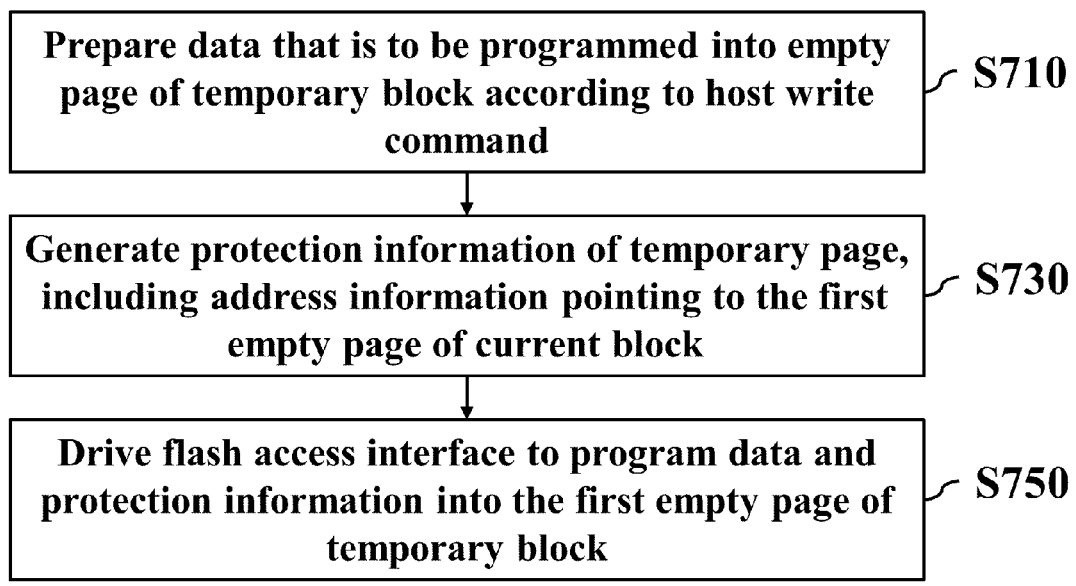
FIG. 7 is a flowchart illustrating a method for programming data with a length shorter than a page length into an empty page of a temporary block according to an embodiment of the invention.

Refer to FIG. 7. The method as shown in FIG. 7 may be performed by the processing unit 134 when loading and executing relevant firmware or software instructions. The processing unit 134 generates protection information of a temporary page, which includes address information at the time pointing to the first empty page of the current block, (step S730) after preparing data with a length (e.g. 4K, 8K or 12K) shorter than a page length that is to be programmed into an empty page (typically being the first empty page) of the temporary block according to a host write command of a command queue (step S710). For example, the processing unit 134 generates protection information that is to be programmed into the spare space 530 of the temporary block 453 as shown in FIG. 5 or the spare space 530a or 530b of the temporary block 453 as shown in FIG. 6. Next, the processing unit 134 drives the flash access I/F 139 to program the data and the protection information into the first empty page of the temporary block (step S750).

Figure 8:
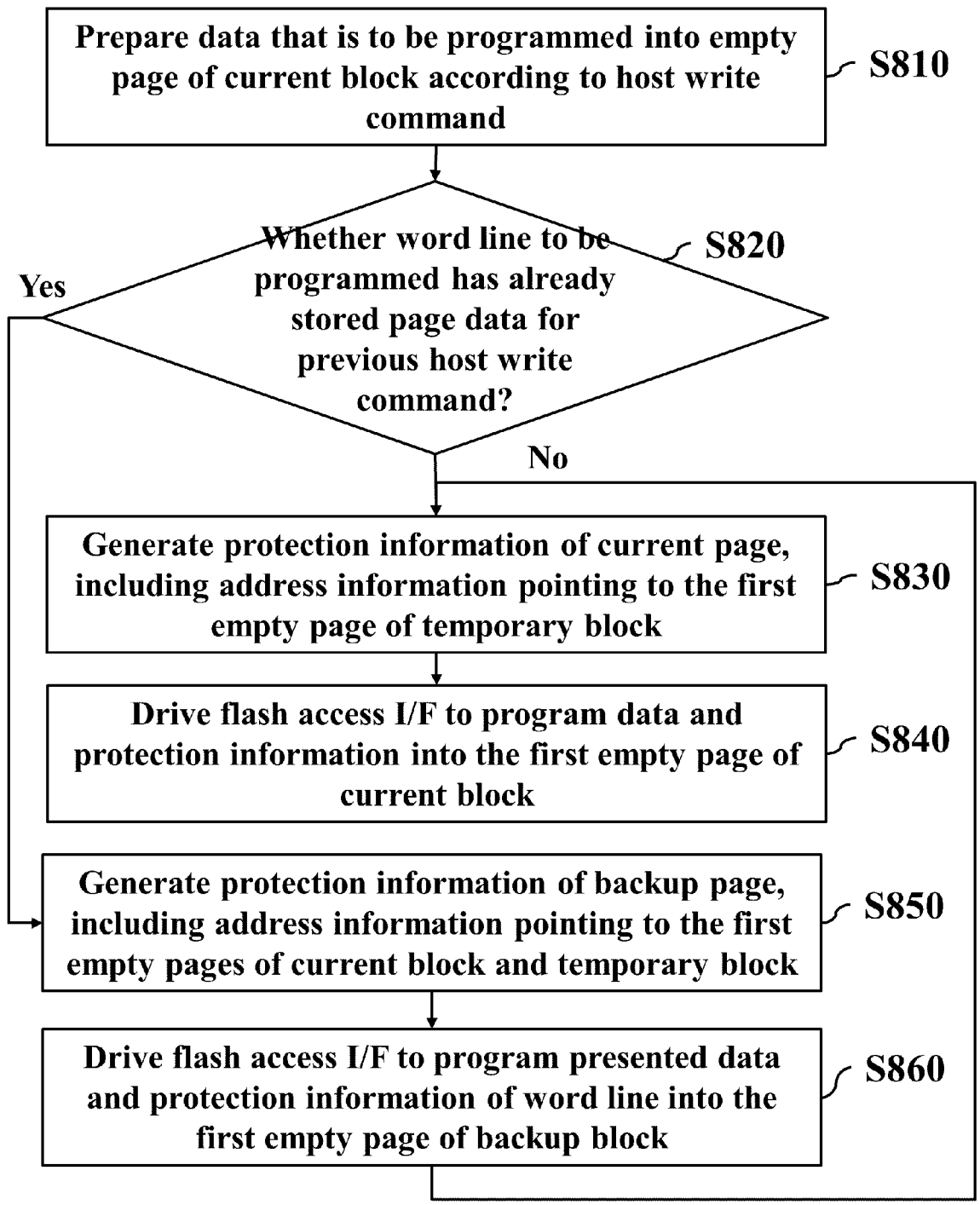
FIG. 8 is a flowchart illustrating a method for programming the whole page of data into an empty page of a current block according to an embodiment of the invention.

Refer to FIG. 8. The method as shown in FIG. 8 may be performed by the processing unit 134 when loading and executing relevant firmware or software instructions. The processing unit 134 prepares data of the whole page that is to be programmed into an empty page (typically being the first empty page) of the current block according to a host write command of a command queue (step S810). Those artisans will realize that the whole page of data may include data obtained from the temporary block, or exclude any therefrom. Next, the processing unit 134 determines whether the word line that the data is to be programmed into has another programmed page data (step S820), for example, if the word line has stored an LSB or CSB page data that was programmed for a previous host write command. If the determination is negative (the "No" path of step S820), for example, the page that the data is to be programmed into is an LSB page, or the programmed LSB or CSB page data of the word line is associated with the same host write command for the prepared data, the processing unit 134 generates protection information of the current page, including address information pointing to the first empty page of the temporary block (step S830). For example, the processing unit 134 generates protection information that is to be programmed into the spare space 510 of the current block 451 as shown in FIG. 5, or the spare space 510a of the current block 451a or the spare space 510b of the current block 451b as shown in FIG. 6. Next, the processing unit 134 drives the flash access I/F 139 to program the data and the protection information into the first empty page of the current block (step S840).

If the determination is positive (the "Yes" path of step S820), the processing unit 134 generates protection information of a backup page, including address information pointing to the first empty pages of the current block and the temporary block (step S850). For example, the processing unit 134 generates protection information that is to be programmed into the spare space 550a and 550b of the backup block 455 as shown in FIG. 5 or 6. The processing unit 134 drives the flash access I/F 139 to program the presented data and protection information of the word line into the first empty page of the backup block (step S860). Next, the processing unit 134 executes steps S830 and S840 as described above.

Figure 9:
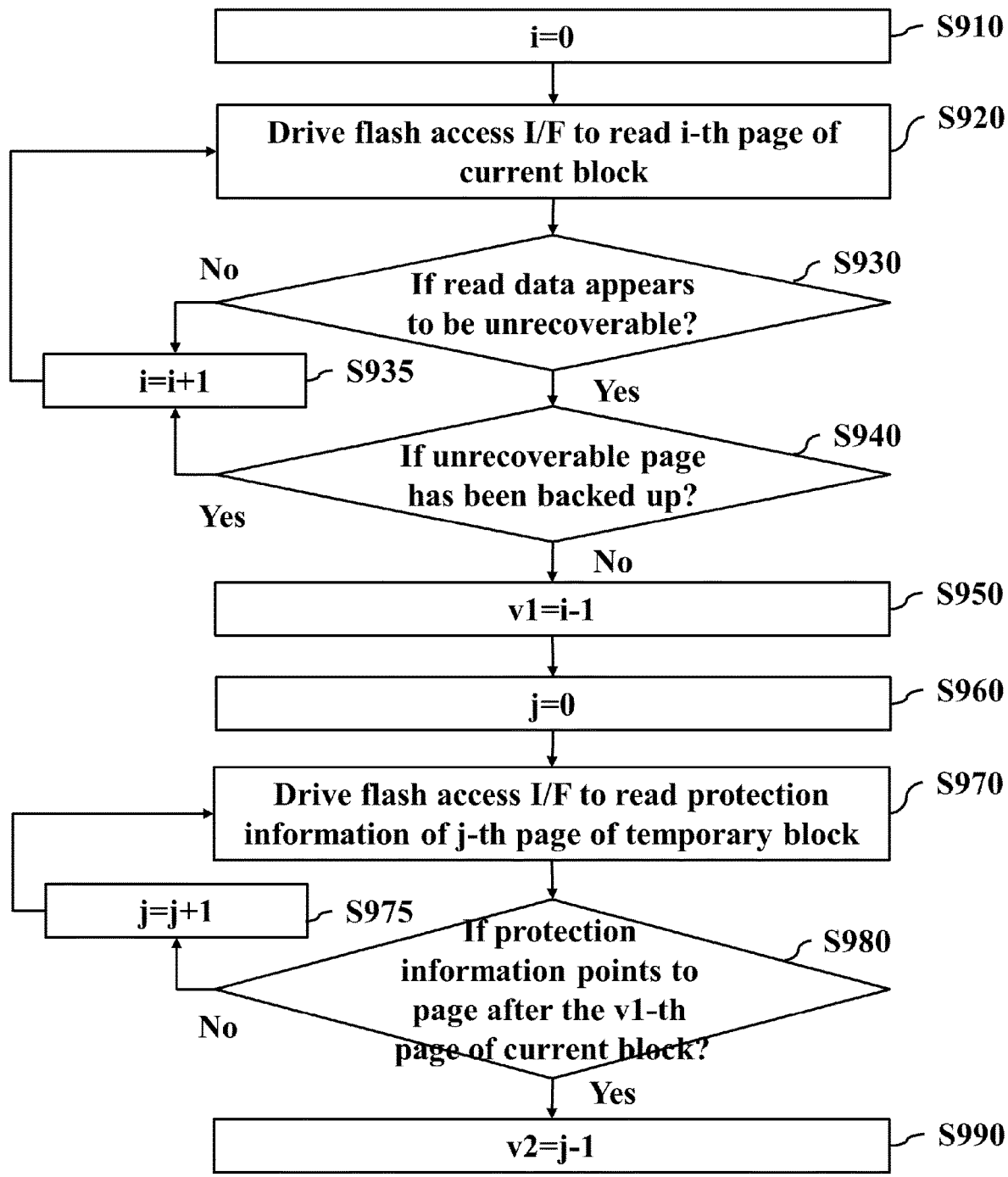
FIG. 9 is a flowchart illustrating a method for marking correct pages in a SPOR process according to an embodiment of the invention.

Since the SPO may damage page data that has been programmed or is being programmed, therefore, after a power restart subsequent to a SPO, the processing unit 134 may perform a SPOR process to mark correct data of the current block and the temporary block. Refer to FIG. 9. The method as shown in FIG. 9 is performed by the processing unit 134 when loading and executing relevant firmware or software instructions. The processing unit 134 uses the variable i to record a page number that is currently scanned within the current block, initialized as 0 (step S910). Following that, the processing unit 134 repeatedly executes a loop (steps S920 to S940) to find a page of the current block that is damaged resulting from the SPO. In each iteration, the processing unit 134 drives the flash access I/F 139 to read the i-th page of the current block (step S920) and performs two determinations (steps S930 and S940). When the read page does not appear to be unrecoverable (the "No" path of step S930), or the read page cannot be recovered but has been backed up in the backup block (the "Yes" path of step S940 following the "Yes" path of step S930), the processing unit 134 determines that data of the read page is correct, increases the variable i by one and proceeds to further determinations for the next page (step S935). When the read page appears to be unrecoverable (the "Yes" path of step S930) and does not backed up in the backup block (the "No" path of step S940), the processing unit 134 determines that data of the read page is incorrect and the loop ends. The read page appearing to be unrecoverable means that, although the processing unit 134 uses the error check and correction (ECC) code of the read page, error bits appeared in the read data cannot be fixed. The read page appearing to be unrecoverable is referred to as an uncorrectable ECC (UECC) page. After the loop ends, the processing unit 134 uses a variable $v1=i-1$ to record a specific number of the last correct page of the current block. In other words, the i-th page and the following pages of the current block have been damaged by the SPO. Those artisans may not implement the backup mechanism with the backup block, therefore, the determination of S940 of the method described above may be omitted.

Next, the processing unit 134 uses the variable j to record a page number that is currently scanned within the temporary block, initialized as 0 (step S960). Following that, the processing unit 134 repeatedly executes a loop (steps S970 to S980) to find correct pages of the temporary block. In each iteration, the processing unit 134 drives the flash access I/F 139 to read the protection information of the j-th page of the temporary block (step S970), and determines whether the protection information points to a page after the v1-th page of the current block (step S980). When the read protection information does not point to a page after the v1-th page of the current block, that is, points to the v1-th page of the current block or an earlier page (the "No" path of step S980), the processing unit 134 determines that the read page is correct, increases the variable j by one and proceeds to a further determination for next page (step S975). When the read protection information points to a page after the v1-th page of the current block (the "Yes" path of step S980), the processing unit 134 determines that the read page is incorrect and the loop ends. After the loop ends, the processing unit 134 uses the variable $v2=j-1$ to record a specific number of the last correct page of the temporary block. In other words, the j-th page (i.e. the first incorrect page) and the following pages of the temporary block have temporary data that cannot be used after the SPO.

In an aspect, embodiments of the invention introduce process steps performed by the processing unit 134 of the apparatus 130 when loading and executing relevant program code: driving the flash access I/F 139 to read pages of the current block 451 in sequence after a power restart subsequent to a SPO; marking the last correct page of the current block 451 according to page read statuses for the current block 451; driving the flash access I/F 139 to read protection information of pages of the temporary block 453 in sequence, so as to mark the first incorrect page of the temporary block 453 whose protection information includes address information pointing to a page after the last correct page of the current block 451; and dropping data of the first incorrect page and pages thereafter of the temporary block 453. In a SPOR process, with droppings of all the pages that were stored later than that of the last correct page of the current block 451 with references made to the protection information of the temporary block 453, it ensures the time order of recovered pages of the current block 451 and the temporary block 453 and avoids any unrecovered page is presented between recovered correct pages in time.

Figure 10:
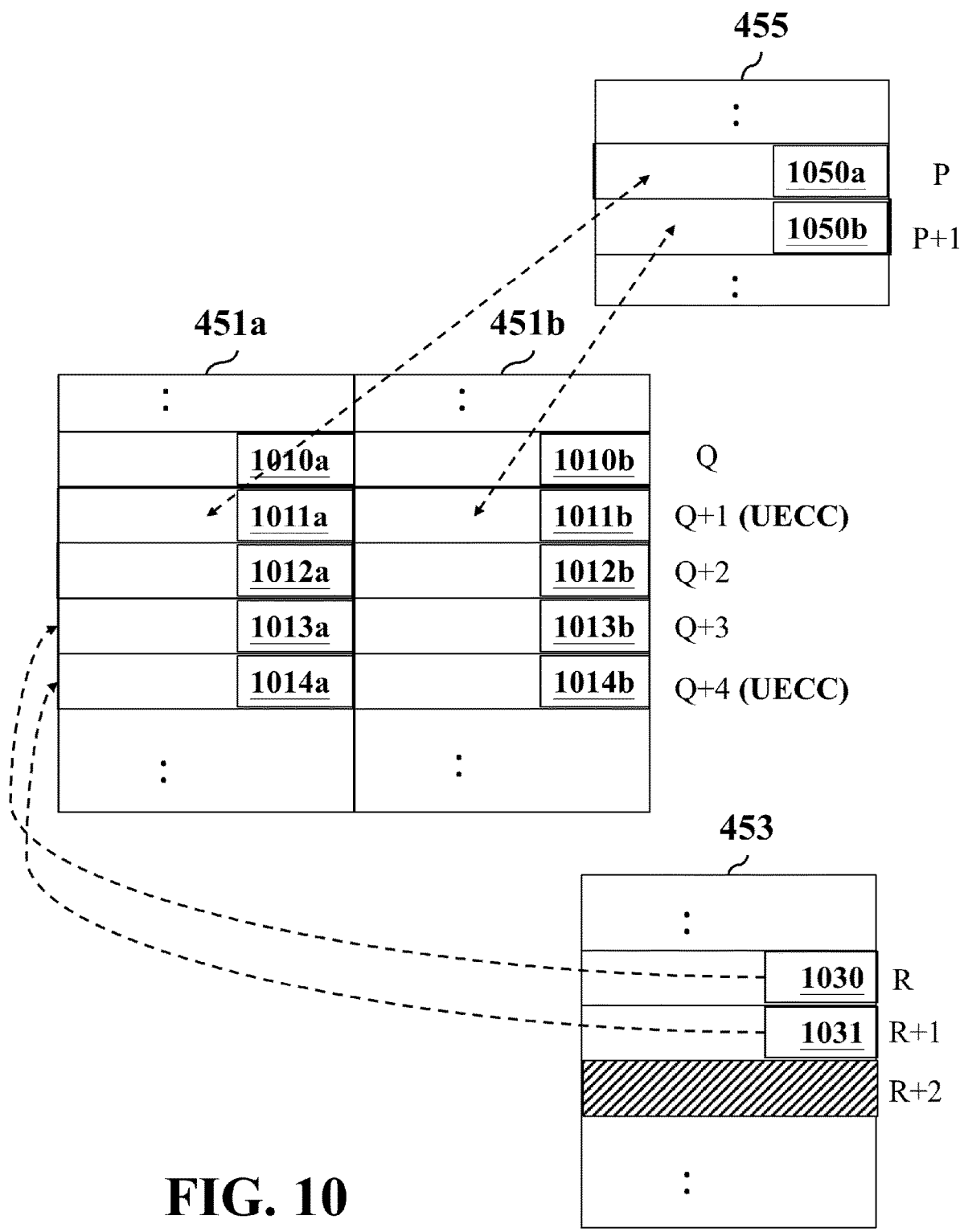
FIG. 10 is a schematic diagram of data and protection information stored in a current block, a temporary block and a backup block according to an embodiment of the invention.

Refer to use cases as shown in FIG. 10. Assume that the current block 451a is allocated on the data plane 310, the current block 451b is allocated on the data plane 330, the (Q+1)-th page of the current block 451a is also stored in the P-th page of the backup block 455, the (Q+1)-th page of the current block 451b is also stored in the (P+1)-th page of the backup block 455, protection information 1030 of the R-th page of the temporary block 453 points to the (Q+3)-th page of the current blocks 451a and 451b, protection information 1031 of the (R+1)-th page of the temporary block 453 points to the (Q+4)-th page of the current blocks 451a and 451b: When detecting that the (Q+1)-th page of the current blocks 451a and 451b is an UECC page (the "Yes" path of step S930) and has been backed up in the temporary block 455 (the "Yes" path of step S940), the processing unit 134 replaces the data of the (Q+1)-th pages of the current blocks 451a and 451b with the data of the P-th page and the (P+1)-th page of the temporary block 455, respectively, and continues the next scanning. When detecting that the (Q+4)-th page of the current blocks 451a and 451b is an UECC page (the "Yes" path of step S930) and hasn't been backed up in the temporary block 455 (the "No" path of step S940), the processing unit 134 determines that the last correct pages of the current blocks 451a and 451b are the (Q+3)-th pages thereof (step S950).

Moreover, when detecting that protection information of the (R+1)-th page of the temporary block 453 points to a page after the last correct pages of the current blocks 451a and 451b (the "Yes" path of step S980), the processing unit 134 the last correct page of the temporary block 453 is the R-th page thereof (step S990).

Figure 11:
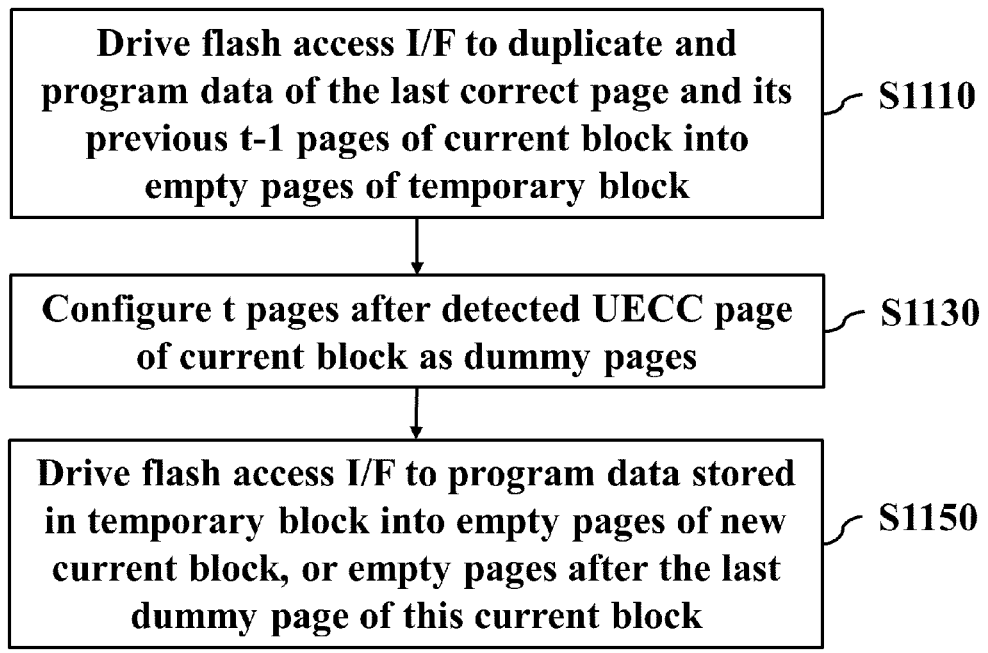
FIG. 11 is a flowchart illustrating a method for migrating data of pages neighboring to an uncorrectable error check and correction (UECC) page in a SPOR process according to an embodiment of the invention.

Although data of the pages before the detected UECC page is all correct, the data retention of memory cells of physical wordlines and pages neighboring to the UECC page may be degraded, for example, available times that data thereon can be regularly read out are decreased, when an SPO occurs. Refer to FIG. 11 showing a method that is performed by the processing unit 134 when loading and executing relevant firmware or software instructions. The processing unit 134 drives the flash access I/F 139 to duplicate data of the last correct page and its previous t−1 pages of the current block in empty pages of the temporary block (step S1110). t may be set to an arbitrary integer ranging from 2 to 5 depending on different system requirements. Next, the processing unit 134 may configure t pages after the UECC page of the current block as dummy pages (step S1130). In some embodiments, the processing unit 134 may drive the flash access I/F 139 to fill t pages after the detected UECC page of the current block with dummy values, for example, "0xFF". Next, the processing unit 134 drives the flash access I/F 139 to program data stored in the temporary block into empty pages of a new current block, or empty pages after the last dummy page of this current block (step S1150).

Figure 12:
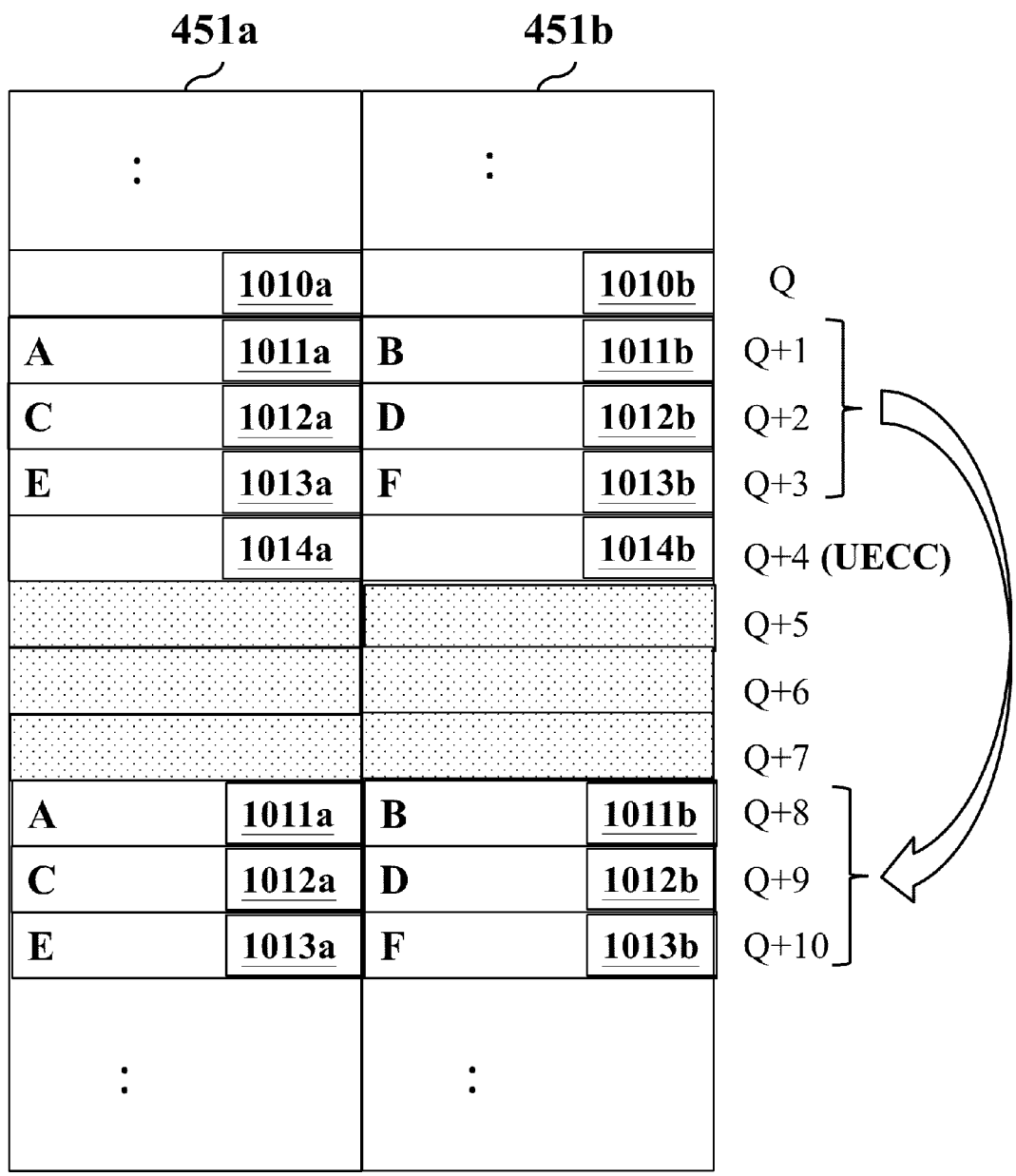
FIG. 12 is a schematic diagram showing a data migration for pages neighboring to an UECC page according to an embodiment of the invention.

Refer to FIG. 12 following the use cases as shown in FIG. 10. Data and protection information 1011a to 1013b of the (Q+1)-th to the (Q+3)-th pages of the current blocks 451a and 451b are duplicated and programmed into the (Q+8)-th to the (Q+10)-th pages of the current blocks 451a and 451b (steps S1110 and S1150). The (Q+5)-th to the (Q+7)-th pages of the current blocks 451a and 451b are configured as dummy pages (step S1130).

However, two or more SPOs may be occurred during data programming for the same current block, resulting in page data that has been moved to be mistakenly determined as correct page data. To address the aforementioned problems, a validity field is inserted into each record of a Flash-to-Host (F2H) table of the SRAM 136, which is associated with the current block, to indicate whether data of a specific page of the current block is valid. Moreover, the method as shown in FIG. 11 may be modified with that of FIG. 13. After configuring dummy pages of the current block and migrating data of candidate pages to empty pages after the last dummy page of the current block successfully (steps S1300, S1130 and S1310), the validity fields of the records of the F2H table, which are associated with the moved pages, the UECC page and the dummy pages of the current block, are set to invalid (step S1330). For example, with references made to FIG. 12, validity fields of the records of the F2H table, which are associated with the (Q+1)-th to the (Q+7)-th pages of the current blocks 451a and 451b, are set to invalid. Those artisans will realize that the host 110 may issue erase commands to the processing unit 134 to erase data of specific logical address(es). After address translations, the processing unit 134 knows which sector(s) of a specific page of the current block the logical address(es) maps to. When data of all sectors of a page of the current block is removed to respond to host erase command(s), the processing unit 134 may set the validity field of the record of the F2H table, which is associated with the removed page, to invalid.

Figure 13:
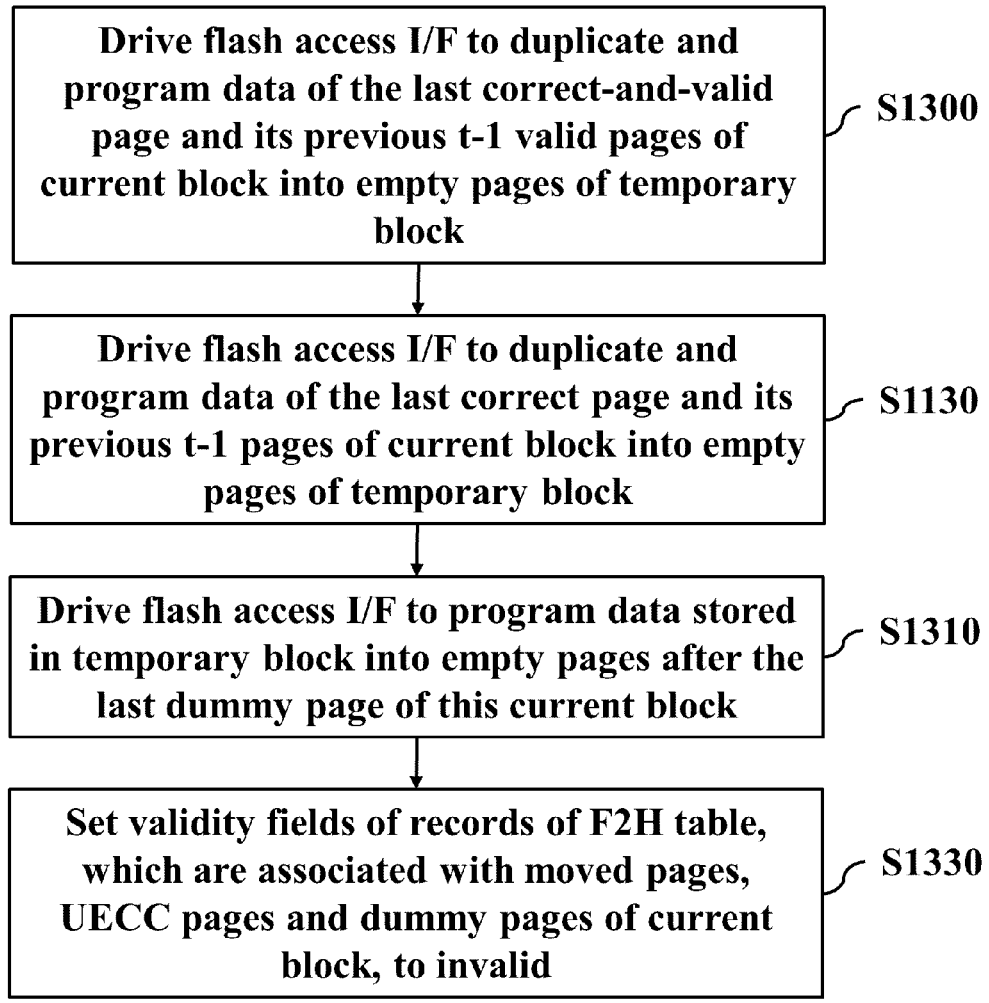
FIG. 13 is a flowchart illustrating a method for migrating data of pages neighboring to an UECC page in a SPOR process according to an embodiment of the invention.

Moreover, step S1110 of FIG. 11 is modified with step S1300 of FIG. 13, in which the processing unit 134 examines the validities of the last correct page and its previous t−1 pages of the current block. If the last correct page and its previous t−1 pages of the current block are invalid pages, then the processing unit 134 does not perform the migration operations of steps S1310 and S1330. In other words, the last correct page and its previous t−1 pages of the current block recited in step S1330 are all valid.

Although the embodiments describe the quantities of the migrated pages and the dummy pages are the same, those artisans may set the quantity of the migrated pages to be different from the quantity of the dummy pages. For example, a total amount of the migrated pages is n2 and a total amount of the dummy pages is n1, where any of n1 and n2 is an arbitrary integer ranging from 2 to 5.

Process steps as shown in FIGS. 7-9, 11 and 13 that are executed by the processing unit 134 may be practiced by computer program products composed of one or more function modules. The function modules are stored in non-volatile storage device and can be loaded and executed by the processing unit 134 at relevant times. Some or all of the aforementioned embodiments of the method of the invention may be implemented in a computer program such as a driver or a firmware program for a dedicated hardware, or a software application program. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier such as a DVD, CD-ROM, USB stick, a hard disk, which may be located in a network server accessible via a network such as the Internet, or any other suitable carrier.

The computer program may be advantageously stored on computation equipment, such as a computer, a notebook computer, a tablet PC, a mobile phone, a digital camera, a consumer electronic equipment, or others, such that the user of the computation equipment benefits from the aforementioned embodiments of methods implemented by the computer program when running on the computation equipment. Such the computation equipment may be connected to peripheral devices for registering user actions such as a computer mouse, a keyboard, a touch-sensitive screen or pad and so on.

Although the embodiment has been described as having specific elements in FIGS. 1, 2 and 4, it should be noted that additional elements may be included to achieve better performance without departing from the spirit of the invention. Each element of FIGS. 1, 2 and 4 is composed of various circuits and arranged to operably perform the aforementioned operations. While the process flows described in FIGS. 7-9, 11 and 13 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A non-transitory computer program product for handling a sudden power off recovery (SPOR) when executed by a processing unit of a device, the non-transitory computer program product comprising program code to:
    drive a flash access interface to read pages of a current block in sequence after a power restart subsequent to a sudden power off (SPO), wherein the current block is a multi-level cell (MLC) block or a triple level cell (TLC) block;
    mark a last correct page of the current block according to page read statuses for the current block;
    configure n1 pages after a next page of the last correct page of the current block as dummy pages; and
    drive the flash access interface to store data of the last correct page and its previous n2-1 pages of the current block in empty pages after a last dummy page of the current block, wherein any of n1 and n2 is a positive integer.

2. The non-transitory computer program product of claim 1, wherein the next page of the last correct page of the current block is an uncorrectable error check and correction (UECC) page.

3. The non-transitory computer program product of claim 2, wherein error bits of the UECC page cannot be fixed after error check and correction (ECC) code of the UECC page is used.

4. The non-transitory computer program product of claim 1, wherein the next page of the last correct page of the current block is an uncorrectable error check and correction (UECC) page and data of the next page of the last correct page of the current block hasn't been stored in a backup block, and the backup block is a single-level cell (SLC) block.

5. The non-transitory computer program product of claim 1, wherein any of n1 and n2 is an integer ranging from 2 to 5.

6. The non-transitory computer program product of claim 1, comprising program code to:
    after storing data of the last correct page and its previous n2-1 pages of the current block in empty pages subsequent to the last dummy page of the current block successfully, set records of a Flash-to-Host (F2H) table of a static random access memory (SRAM), which are associated with the last correct page, its previous n2-1 pages and the dummy pages, to invalid.

7. The non-transitory computer program product of claim 6, wherein the last correct page and its previous n2-1 pages of the current block are all valid before associated records of the F2H table of the SRAM are modified.

8. A method for handling a sudden power off recovery (SPOR), performed by a processing unit of a device, comprising:
    reading pages of a current block in sequence after a power restart subsequent to a sudden power off (SPO), wherein the current block is a multi-level cell (MLC) block or a triple level cell (TLC) block;
    marking a last correct page of the current block according to page read statuses for the current block;
    configuring n1 pages after a next page of the last correct page of the current block as dummy pages; and
    storing data of the last correct page and its previous n2-1 pages of the current block in empty pages after a last dummy page of the current block, wherein any of n1 and n2 is a positive integer.

9. The method of claim 8, wherein the next page of the last correct page of the current block is an uncorrectable error check and correction (UECC) page, and error bits of the UECC page cannot be fixed after error check and correction (ECC) code of the UECC page is used.

10. The method of claim 8, wherein the next page of the last correct page of the current block is an uncorrectable error check and correction (UECC) page and data of the next page of the last correct page of the current block hasn't been stored in a backup block, and the backup block is a single-level cell (SLC) block.

11. The method of claim 8, wherein any of n1 and n2 is an integer ranging from 2 to 5.

12. The method of claim 8, comprising:
    after storing data of the last correct page and its previous n2-1 pages of the current block in empty pages subsequent to the last dummy page of the current block successfully, setting records of a Flash-to-Host (F2H) table of a static random access memory (SRAM), which are associated with the last correct page, its previous n2-1 pages and the dummy pages, to invalid.

13. The method of claim 8, wherein the last correct page and its previous n2-1 pages of the current block are all valid before associated records of the F2H table of the SRAM are modified.

14. An apparatus for handling a sudden power off recovery (SPOR), comprising:
  a flash access interface; and
  a processing unit, coupled to the flash access interface, arranged to operably drive the flash access interface to read pages of a current block in sequence after a power restart subsequent to a sudden power off (SPO), wherein the current block is a multi-level cell (MLC) block or a triple level cell (TLC) block; mark a last correct page of the current block according to page read statuses for the current block; configure n1 pages after a next page of the last correct page of the current block as dummy pages; and drive the flash access interface to store data of the last correct page and its previous n2-1 pages of the current block in empty pages after a last dummy page of the current block, wherein any of n1 and n2 is a positive integer.

15. The apparatus of claim 14, wherein the next page of the last correct page of the current block is an uncorrectable error check and correction (UECC) page.

16. The apparatus of claim 15, wherein error bits of the UECC page cannot be fixed after error check and correction (ECC) code of the UECC page is used.

17. The apparatus of claim 14, wherein the next page of the last correct page of the current block is an uncorrectable error check and correction (UECC) page and data of the next page of the last correct page of the current block hasn't been stored in a backup block, and the backup block is a single-level cell (SLC) block.

18. The apparatus of claim 14, wherein any of n1 and n2 is an integer ranging from 2 to 5.

19. The apparatus of claim 14, wherein the processing unit is arranged to operably, after storing data of the last correct page and its previous n2-1 pages of the current block in empty pages subsequent to the last dummy page of the current block successfully, set records of a Flash-to-Host (F2H) table of a static random access memory (SRAM), which are associated with the last correct page, its previous n2-1 pages and the dummy pages, to invalid.

20. The apparatus of claim 14, wherein the last correct page and its previous n2-1 pages of the current block are all valid before associated records of the F2H table of the SRAM are modified.

* * * * *